US011609156B2

(12) United States Patent
Nagarathinam et al.

(10) Patent No.: US 11,609,156 B2
(45) Date of Patent: Mar. 21, 2023

(54) METHODS AND SYSTEMS FOR BENCHMARKING ASSET PERFORMANCE

(71) Applicant: Tata Consultancy Services Limited, Mumbai (IN)

(72) Inventors: Srinarayana Nagarathinam, Tamil Nadu (IN); Venkata Ramakrishna P, Telangana (IN); Arunchandar Vasan, Tamil Nadu (IN); Venkatesh Sarangan, Tamil Nadu (IN); Anand Sivasubramaniam, Tamil Nadu (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 336 days.

(21) Appl. No.: 16/578,061

(22) Filed: Sep. 20, 2019

(65) Prior Publication Data

US 2020/0096421 A1 Mar. 26, 2020

(30) Foreign Application Priority Data

Sep. 21, 2018 (IN) .............................. 201821035597

(51) Int. Cl.
*G06Q 10/04* (2023.01)
*G01M 99/00* (2011.01)
*G06Q 10/0639* (2023.01)

(52) U.S. Cl.
CPC .......... *G01M 99/002* (2013.01); *G06Q 10/04* (2013.01); *G06Q 10/06393* (2013.01)

(58) Field of Classification Search
CPC combination set(s) only.
See application file for complete search history.

(56) References Cited

U.S. PATENT DOCUMENTS

| 2013/0179373 | A1* | 7/2013 | Mutchnik | .......... G06Q 30/0283 |
| | | | | 705/412 |
| 2013/0191188 | A1* | 7/2013 | Mathur | ............ G06Q 10/06393 |
| | | | | 705/7.39 |

(Continued)

OTHER PUBLICATIONS

Ertesvag, Ivar S. (Mar. 2001). "Society exergy analysis: a comparison of different societies" Department of Applied Mechanics Thermodyanamics and Fluid Dyamics, Norwegian University of Science and Technology, pp. 253-270, vol. 26, Issue 3, Link: http://folk.ntnu.no/ivarse/socex.pdf.

(Continued)

*Primary Examiner* — Arif Ullah
(74) *Attorney, Agent, or Firm* — Finnegan, Henderson, Farabow, Garrett & Dunner LLP (57) ABSTRACT

Traditionally, benchmarking of asset performance involves comparing actual performance with ideal values that correspond to test conditions which may not be realized in practice leading to inappropriate ranking of the assets. Systems and methods of the present disclosure use condition-aware reference curves for estimating the maximum possible operating efficiencies (under specific operating conditions) instead of the theoretical maximum efficiencies. The reference curves are received from the manufacturer or obtained from on-site test results. Benchmarking is then performed based on two dimensions, viz., an inter-asset metric and an intra-asset metric that are analogous to the first law and second law of thermodynamics respectively. The two-dimensional benchmarking then helps in identifying inefficient assets that may be analyzed further for finding the root cause. Tracking the performance of assets over time greatly helps in operations and maintenance, and thus reducing downtime of systems and accordingly the operating costs.

13 Claims, 5 Drawing Sheets

(56) References Cited

U.S. PATENT DOCUMENTS

2014/0039710 A1* 2/2014 Carter ................. G05B 13/041
 700/291
2018/0364652 A1* 12/2018 Blank ..................... H04Q 9/00

OTHER PUBLICATIONS

Christopher Koroneos et al. (Jan. 17, 2012). "A review on exergy comparison of hydrogen production methods from renewable energy sources", Energy & Environmental Science, vol. 5, pp. 6640-6651.
Schmidt, Dietrich, (Nov. 14, 2012), "Benchmarking of Low "Exergy" Buildings", Inderscience Enterprises Ltd, https://www.researchgate.net/profile/Dietrich_Schmidt2/publication/264437678_Benchmarking_of_low_'exergy'_buildings/links/54ae649f0cf2213c5fe446ea.pdf.
Garai, Cesare Biserni; Massimo, (Nov. 2015), "First and second law analysis applied to building envelope: A theoretical approach on the potentiality of Bejan's theory", Energy Reports pp. 181-183, vol. 1, Elsevier B.V., Link: https://www.sciencedirect.com/science/article/pii/S235248471500030X.

\* cited by examiner

METHODS AND SYSTEMS FOR BENCHMARKING ASSET PERFORMANCE

PRIORITY CLAIM

This U.S. patent application claims priority under 35 U.S.C. § 119 to: Indian Patent Application No. 201821035597, filed on 21 Sep. 2018. The entire contents of the aforementioned application are incorporated herein by reference.

TECHNICAL FIELD

The disclosure herein generally relates to comparative performance analyses of assets, and, more particularly, to systems and methods for benchmarking asset performance based on operating conditions.

BACKGROUND

Understanding the performance of any asset is critical to its operations and maintenance. Benchmarking helps in identifying the good performing assets and the bad performing assets to improve them further. An asset and parameters defining its performance depend on the domain under consideration. For example, energy systems such as wind turbines and chillers are benchmarked with respect to their efficiency/Coefficient of Performance (COP) metrics. For benchmarking energy consumption of buildings, Energy Usage Intensity (EUI) based standards are used. Similarly in automobiles, actual mileage is compared with manufacturer's rating.

Typically in benchmarking, the 'actuals' are compared with 'ideals' for making assessments. Often the 'ideals' correspond to reference, design or rated conditions which are seldom realized in practice; and the assumed rated conditions may be significantly different from the operating conditions. For example, reference mileage that an automobile maker quotes often corresponds to ideal set of road, skill and traffic conditions (referred as test conditions), which may be seldom realized in practice. Moreover, assets are often chosen off-the-shelf which are not designed for the exact specific operating conditions. Benchmarking the assets against design conditions may also result in unfair comparisons. Therefore a state-agnostic benchmarking approach dis-favors the assets that operate under hostile or off-design conditions; and ranks them with inappropriate score.

SUMMARY

Embodiments of the present disclosure present technological improvements as solutions to one or more of the above-mentioned technical problems recognized by the inventors in conventional systems.

In an aspect, there is provided a processor implemented method for benchmarking asset performance comprising: obtaining, by one or more hardware processors, a plurality of condition-aware reference curves pertaining to a plurality of assets; estimating, by the one or more hardware processors, a maximum operating efficiency associated with each of the plurality of assets from the obtained plurality of condition-aware reference curves; monitoring in real time, by the one or more hardware processor, one or more parameters pertaining to each of the plurality of assets; computing, by the one or more hardware processors, an inter-asset metric for each of the plurality of assets using the monitored one or more parameters at each instance of time and a corresponding condition-aware reference curve, wherein the inter-asset metric is an efficiency metric based on the first law of thermodynamics; computing, by the one or more hardware processors, an intra-asset metric for each of the plurality of assets at each instance of time, using the computed inter-asset metric and the maximum operating efficiency of a corresponding asset from the plurality of assets, wherein the intra-asset metric is an efficiency metric based on the second law of thermodynamics; converting, by the one or more hardware processors, a time-series associated with the inter-asset metric and the intra-asset metric for each of the plurality of assets to point values using a statistical metric; and analyzing, by the one or more hardware processors, performance of an asset from the plurality of assets using the point values.

In another aspect, there is provided a system comprising: one or more data storage devices operatively coupled to the one or more processors and configured to store instructions configured for execution by the one or more processors to: obtain a plurality of condition-aware reference curves pertaining to a plurality of assets; estimate, a maximum operating efficiency associated with each of the plurality of assets from the obtained plurality of condition-aware reference curves; monitor in real time one or more parameters pertaining to each of the plurality of assets; compute an inter-asset metric for each of the plurality of assets using the monitored one or more parameters at each instance of time and a corresponding condition-aware reference curve, wherein the inter-asset metric is an efficiency metric based on the first law of thermodynamics; compute an intra-asset metric for each of the plurality of assets at each instance of time, using the computed inter-asset metric and the maximum operating efficiency of a corresponding asset from the plurality of assets, wherein the intra-asset metric is an efficiency metric based on the second law of thermodynamics; convert a time-series associated with the inter-asset metric and the intra-asset metric for each of the plurality of assets to point values using a statistical metric; and analyze performance of an asset from the plurality of assets using the point values.

In yet another aspect, there is provided a computer program product comprising a non-transitory computer readable medium having a computer readable program embodied therein, wherein the computer readable program, when executed on a computing device, causes the computing device to: obtain a plurality of condition-aware reference curves pertaining to a plurality of assets; estimate, a maximum operating efficiency associated with each of the plurality of assets from the obtained plurality of condition-aware reference curves; monitor in real time one or more parameters pertaining to each of the plurality of assets; compute an inter-asset metric for each of the plurality of assets using the monitored one or more parameters at each instance of time and a corresponding condition-aware reference curve, wherein the inter-asset metric is an efficiency metric based on the first law of thermodynamics; compute an intra-asset metric for each of the plurality of assets at each instance of time, using the computed inter-asset metric and the maximum operating efficiency of a corresponding asset from the plurality of assets, wherein the intra-asset metric is an efficiency metric based on the second law of thermodynamics; convert a time-series associated with the inter-asset metric and the intra-asset metric for each of the plurality of assets to point values using a statistical metric; and analyze performance of an asset from the plurality of assets using the point values.

In an embodiment of the present disclosure, the one or more processors are further configured to obtain a plurality of condition-aware reference curves by receiving the plurality of condition-aware reference curves encompassing an operating range of the asset in a factory setting or obtaining the plurality of condition-aware reference curves via on-site test results.

In an embodiment of the present disclosure, the one or more processors are further configured to: analyze performance of an asset by generating a scatter plot of the inter-asset metric along the x-axis and the intra-asset metric along the y-axis and comparing the assets from the plurality of assets in two-dimensions.

In an embodiment of the present disclosure, the statistical metric is either mean or median of the inter-asset metric and the intra-asset metric calculated for every point in the time series.

In an embodiment of the present disclosure, the assets in the plurality of assets are cross-domain assets, wherein the inter-asset metric pertains to assets within a domain.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Tracking performance of assets over time can greatly help in operations and maintenance, and thus reducing downtime of systems. This in turn may reduce operating costs. Conventionally, performance of an asset is benchmarked considering ideal conditions rather than actual operating conditions which may be significantly different from the ideal conditions resulting in inappropriate ranking of the assets. To better understand equipment performance, it is not sufficient to compare its efficiency with other similar equipment but also with its own achievable maximum operating efficiency. Knowing the system's relative performance in a group may indicate that further analysis is required to identify possible causes for the inefficiency. Systems and methods of the present disclosure address this technical gap by enabling benchmarking of the performance in two dimensions, an inter-asset metric and an intra-asset metric, wherein the inter-asset metric involves comparing the performance of the asset with other assets while the intra-asset metric involves comparing the performance of the asset with its own achievable maximum operating efficiency.

Energy systems can be broadly classified into energy transferring and energy converting device. As the names indicate, energy converting devices convert one form of energy to another. For example: wind turbines convert wind energy to electrical energy; in an electric bulb the electrical energy is converted to heat and light; and in automobiles chemical and thermal energy is converted to mechanical energy. While the primary purpose of energy transferring device is to add or remove heat from a fluid mainly through multiple fluid interactions, the entire process may involve energy conversion too. For example, in a chiller plant, returning water from buildings is cooled to a lower temperature through interaction with a refrigerant in the evaporator, while the compressor in the refrigerant cycle converts electrical energy to mechanical or thermal energy.

The performance of energy systems is mainly assessed through an efficiency metric. Efficiency (n) is defined as, $$\eta = \frac{\text{Power output}}{\text{Power input}} \quad (1)$$

In energy converters, energy output can only be a portion of the input, and hence the efficiency is always less than 100%. In energy extractors, the energy output is not a portion of the inputs and hence the ratio can be higher than 100% without violating the first law of thermodynamics. This concept of energy input and output can also be discussed with respect to energy conversions between different grades of energy (energy quality). In chillers, high grade electrical energy (input) is used for low grade heat transfers and hence the efficiency can be greater than 100%. In wind turbines, the wind energy is converted to high grade electrical energy (output), and hence the energy efficiency will always be less than 100% in accordance with the first law of thermodynamics.

In order to differentiate these two kinds of efficiencies, for the energy converting devices, it is simply termed as efficiency while for energy transferring device it is termed as Coefficient Of Performance (COP), which by definition is, $$COP = \frac{\text{Heat transfer rate output}}{\text{Electrical power input}} \quad (2)$$

Energy systems are often compared with each other through the use of the above efficiency metrics. Although this seems fine, it would require that the design, size and operating conditions such as ambient conditions, observed system loads, quality of fuel, etc. are identical among the systems for a fair comparison, which is rarely the case. For example, for the same load and ambient conditions, it would not be completely justified to compare an Air-Cooled Chiller (ACCH) with a Water-Cooled Chiller (WCCH). The inherent design of WCCH is such that $COP_{WCCH} > COP_{ACCH}$. Using the same analogy, it is unfair to compare a wind-turbine in a windy location with a turbine in sober wind conditions, all else being the same.

Another metric that has been extensively used is the energy efficiency (second law efficiency), which is given by, $$\eta_{II} = \frac{\eta_I}{\eta_{max}} \quad (3)$$

$$COP_{II} = \frac{COP_I}{COP_{max}} \quad (4)$$

wherein the suffixes 'I', 'II' and 'max' are the efficiencies calculated based on the first law of thermodynamics, the second law of thermodynamics and the theoretical maximum respectively. The theoretical maximum efficiency for energy transferring devices like chillers is given by, $$COP_{max} = COP_{Carnot} = 1 - \frac{T_2}{T_1} \quad (5)$$

wherein $T_2$ is the temperature of sink in Kelvin and $T_1$ is the temperature of the source in Kelvin, and the theoretical maximum efficiency for energy converting devices like wind turbines is given by, $$\eta_{max} = \eta_{Betz's} = 59.3\% \rightarrow \quad (6)$$

It may be noted that the above equations also cannot be used for fair comparison. For example, two chillers of different capacities and loads operating between same two temperatures of source and sink will have the same $COP_{Carnot}$, and the Betz's law for wind turbines gives the same efficiency no matter the design and location of the device.

Hence there is a need for a better performance metric to compare assets across various domains such as an energy converting device with an energy transferring device. In accordance with the present disclosure, an approach is provided for arriving at an efficiency metric based on the second law of thermodynamics and also benchmarking assets on two-dimensions to enable identifying poor performers for further analysis. Although the description hereinafter pertains to energy systems, it may be understood by those skilled in the art that the methods and systems of the present disclosure may be applied to assets in other domains such as finance, manufacturing and human resources, wherever the efficacy of assets and processes such as cost of operations or performance of employees need to be subjectively benchmarked.

Referring now to the drawings, and more particularly to FIG. 1 through FIG. 4 where similar reference characters denote corresponding features consistently throughout the figures, there are shown preferred embodiments and these embodiments are described in the context of the following exemplary system and/or method.

Figure 1:
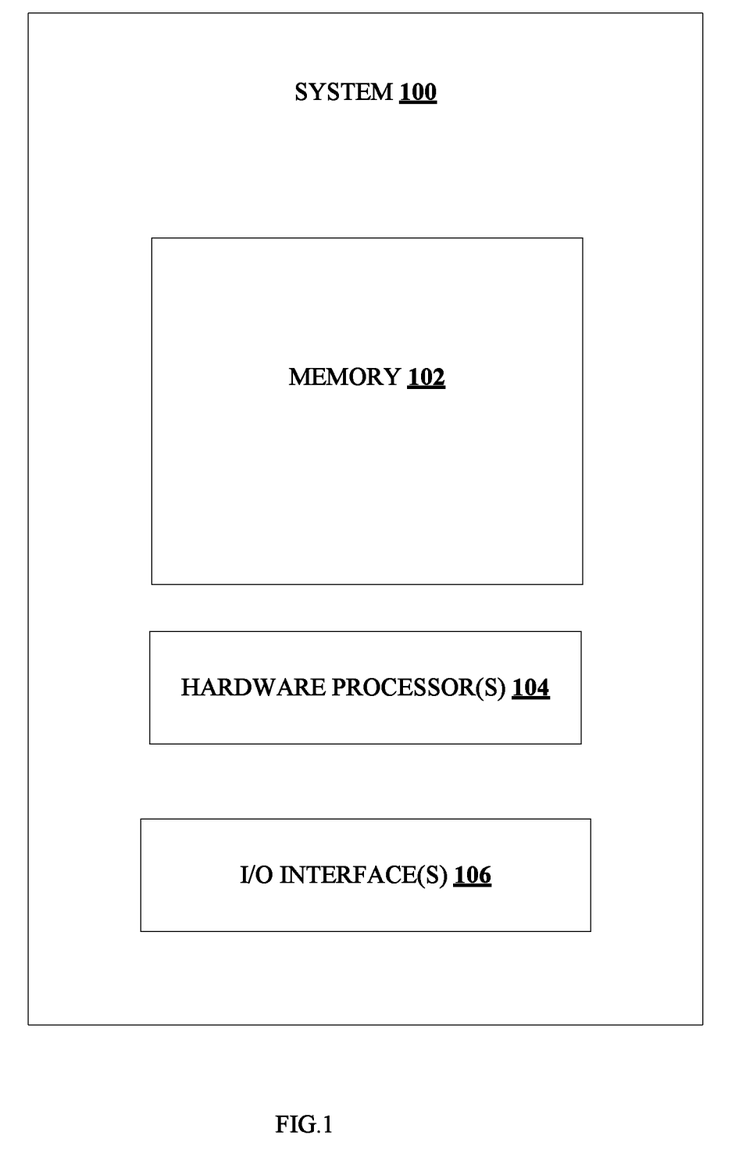
FIG. 1 illustrates an exemplary block diagram of a system for benchmarking asset performance, in accordance with an embodiment of the present disclosure.

FIG. 1 illustrates an exemplary block diagram of a system 100 for benchmarking asset performance in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the system 100 can be implemented in a variety of computing systems, such as laptop computers, notebooks, hand-held devices, workstations, mainframe computers, servers, a network cloud and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102.

Figure 2A:
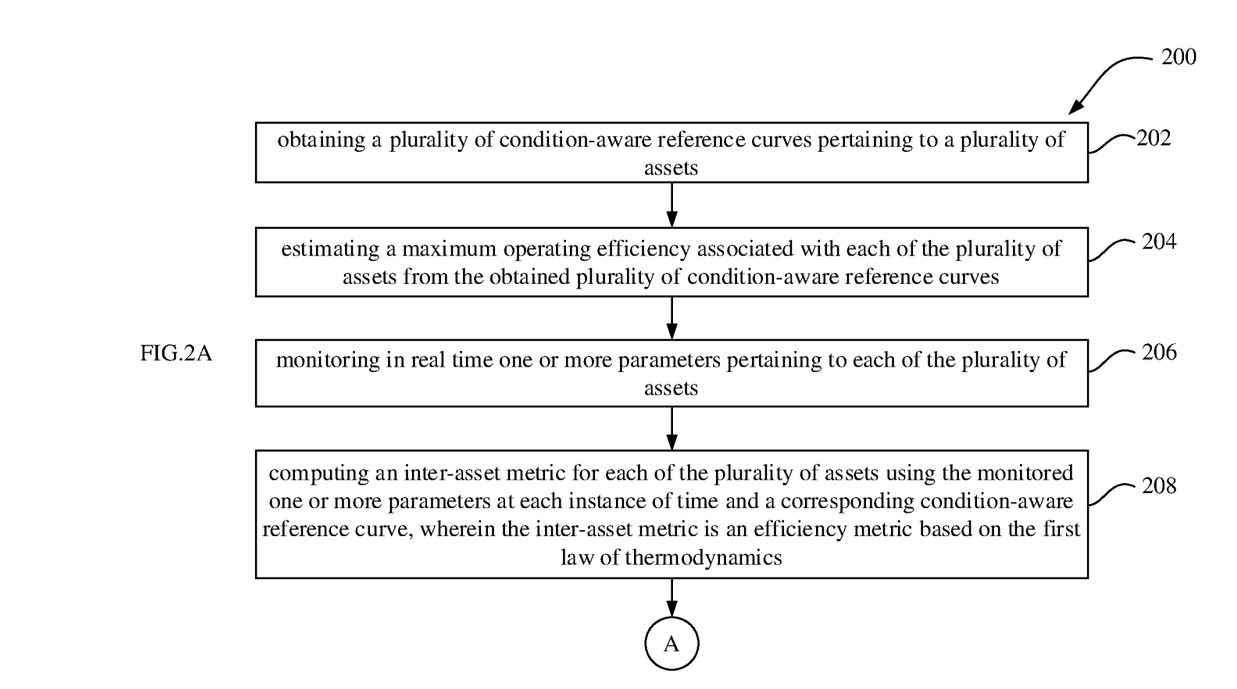
FIG. 2A through FIG. 2B illustrates an exemplary flow diagram for a computer implemented method for benchmarking asset performance, in accordance with an embodiment of the present disclosure.
Figure 2B:
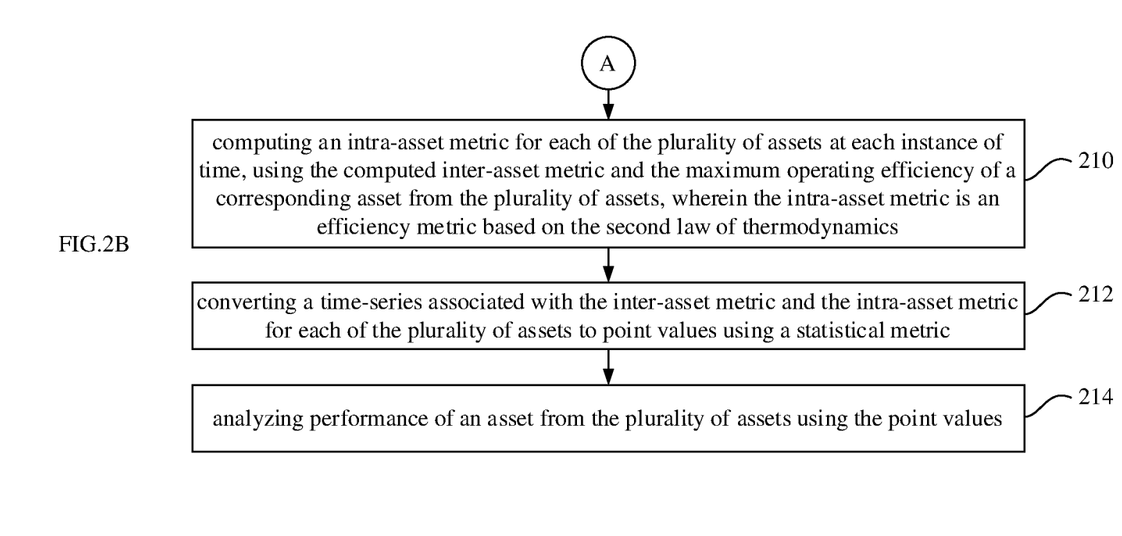

FIG. 2A through FIG. 2B illustrates an exemplary flow diagram for a computer implemented method 200 for benchmarking asset performance, in accordance with an embodiment of the present disclosure. In an embodiment, the system 100 includes one or more data storage devices or memory 102 operatively coupled to the one or more processors 104 and is configured to store instructions configured for execution of steps of the method 200 by the one or more processors 104. The steps of the method 200 will now be explained in detail with reference to the components of the system 100 of FIG. 1. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

In accordance with an embodiment of the present disclosure, the one or more processors 104 are configured to obtain, at step 202, a plurality of condition-aware reference curves pertaining to a plurality of assets under consideration. In an embodiment, the plurality of condition-aware reference curves encompass the complete operating range of the asset and are obtained in a factory setting. In an embodiment, when the factory settings are not available, the plurality of condition-aware reference curves may be generated through on-site test results. Again, if any operating condition is not seen in the past, then a current observation is considered as part of the on-site test result.

In accordance with an embodiment of the present disclosure, the one or more processors 104 are configured to estimate, at step 204, a maximum operating efficiency associated with each of the plurality of assets from the obtained plurality of condition-aware reference curves. In accordance with the present disclosure, the estimated maximum operating efficiency is the maximum possible operating efficiency under specific operating conditions instead of the theoretical maximum efficiency.

In accordance with an embodiment of the present disclosure, the one or more processors 104 are configured to monitor in real time, at step 206, one or more parameters pertaining to each of the plurality of assets. In accordance with the present disclosure, the one or more parameters define performance of the corresponding asset depending on the domain under consideration. For example, energy systems such as wind turbines and chillers are benchmarked with respect to their efficiency/Coefficient of Performance (COP) metrics. For benchmarking energy consumption of buildings, Energy Usage Intensity (EUI) based standards are used.

Figure 3:
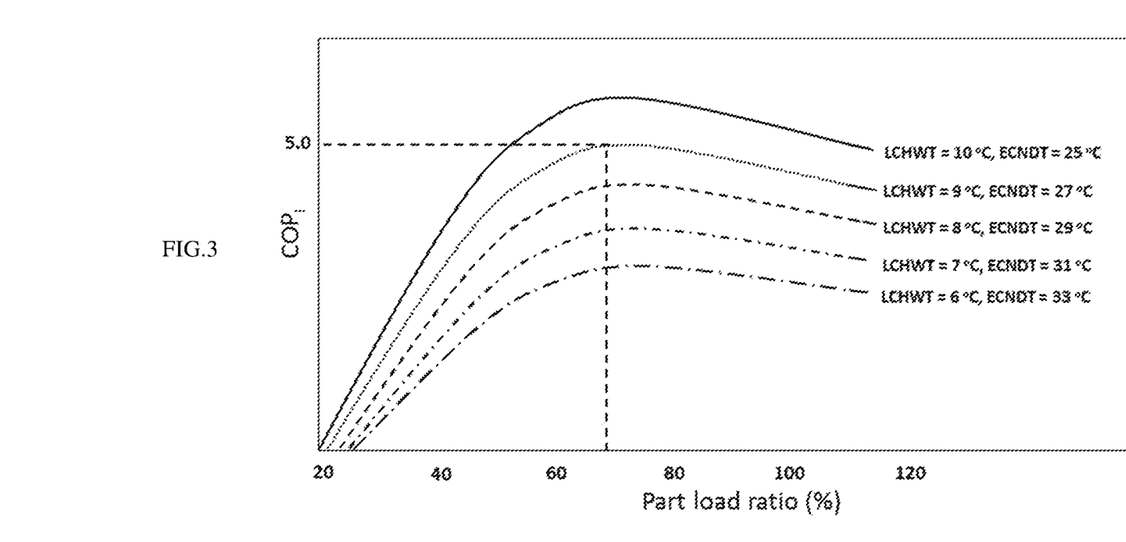
FIG. 3 illustrates exemplary manufacturer's performance curves obtained for a chiller.

FIG. 3 illustrates exemplary manufacturer's performance curves obtained for a chiller. The method 200 is further explained with reference to chillers. However, a similar approach may be applied to other energy systems and assets in other domains. The performance of a chiller is largely driven by the temperature of the chilled water leaving the chiller, temperature of the fluid entering the condenser (air for air-cooled and water for water-cooled chillers) and cooling load. FIG. 3 shows typical COP curves for chillers with respect to these parameters. Generally, the manufacturer's curves cover the entire recommended range of the operating variables.

In accordance with an embodiment of the present disclosure, the one or more processors 104 are configured to compute, at step 208, an inter-asset metric for each of the plurality of assets using the monitored one or more parameters at each instance of time and a corresponding condition-aware reference curve, wherein the inter-asset metric is an efficiency metric based on the first law of thermodynamics and interchangeably referred to as the first law efficiency. With reference to chillers, the inter-asset metric or the first law efficiency metric is calculated as follows:

$$COP_I = \frac{\text{Cooling load}}{\dot{W}_{comp}} \quad (7)$$

where $\dot{W}_{comp}$ is the electrical power consumed by the compressor. The cooling load is further calculated as, $$\text{Cooling load} = \dot{m}_w C_{pw} \Delta T \quad (8)$$

where $\dot{m}_w$ is the mass flow rate of chilled water through the evaporator, $C_{pw}$ is the specific heat capacity of water and $\Delta T$ is the temperature difference of chilled water across the evaporator.

In accordance with an embodiment of the present disclosure, the one or more processors 104 are configured to compute, at step 210, an intra-asset metric for each of the plurality of assets at each instance of time, using the computed inter-asset metric and the maximum operating efficiency of a corresponding asset from the plurality of assets, wherein the intra-asset metric is an efficiency metric based on the second law of thermodynamics. With reference to chillers, the intra-asset metric, interchangeably referred to as the second law efficiency is computed as follows. Say the temperature of water leaving the chiller is 9° C., the temperature of water entering the condenser is 27° C. and part load ratio is 70%. Given these operating parameters, from FIG. 3, the maximum operating COP is 5.0. The second law efficiency in this case is, $$COP_{II} = \frac{COP_I}{COP_{max}} = \frac{COP_I}{5.0} \quad (9)$$

Using equations (7) and (9), both the first law and the second law efficiencies are established.

In accordance with an embodiment of the present disclosure, for subjective benchmarking, the one or more processors 104 are configured to convert, at step 212, a time-series associated with the inter-asset metric and the intra-asset metric for each of the plurality of assets to point values using a statistical metric. In an embodiment, the statistical metric is either mean or median of the inter-asset metric and the intra-asset metric calculated for every point in the time series. Accordingly, for any asset, using the historical logs of the operating parameters and/or the manufacturer's curves, and assuming each point in time is independent from others, the first law and the second law efficiencies are calculated for each point. In an embodiment respective medians across all the points for both the first law efficiency and the second law efficiency are computed.

Figure 4:
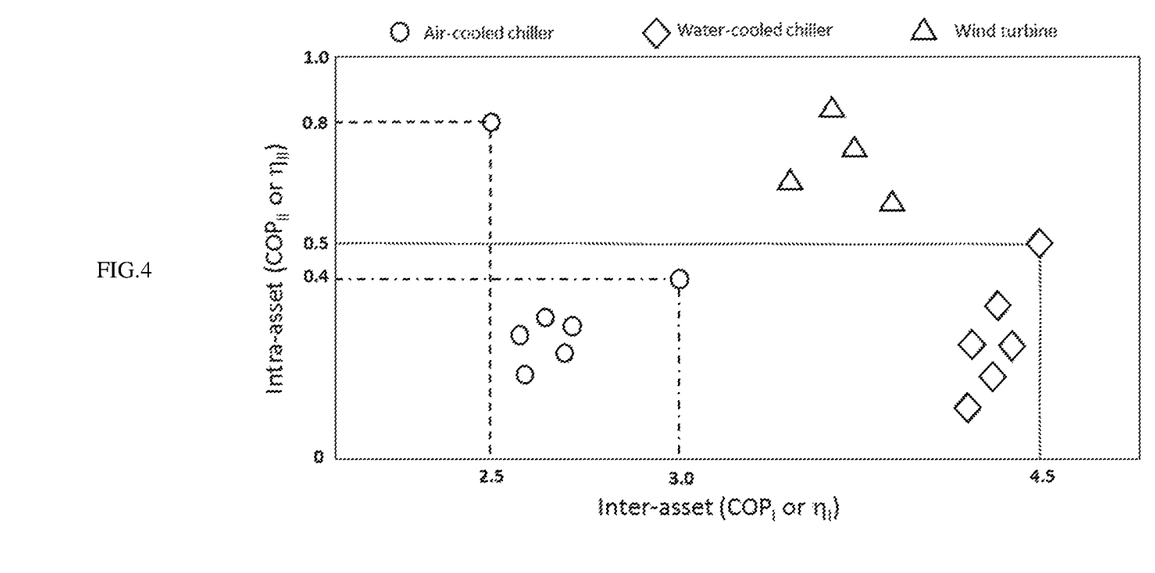
FIG. 4 illustrates benchmarking asset performance, in accordance with an embodiment of the present disclosure.

In accordance with an embodiment of the present disclosure, for subjective benchmarking, the one or more processors 104 are configured to analyze, at step 214, performance of an asset from the plurality of assets using the point values generated at step 212. In an embodiment, the step of analyzing performance of an asset comprises generating a scatter plot of the inter-asset metric along the x-axis and the intra-asset metric along the y-axis and comparing the assets from the plurality of assets in two-dimensions. In an embodiment, the assets may be compared in two dimensions as shown in FIG. 4 wherein benchmarking of asset performance is illustrated, in accordance with an embodiment of the present disclosure. In FIG. 4, wherein exemplary energy systems are compared, the energy systems of similar kind may form clusters as illustrated. As known in the art, generally the COP of water-cooled chillers is higher than the COP of air-cooled chillers due to their inherent design. For this reason, COP metric alone may not suffice to identify the better performer. For example, consider two air-cooled chillers and one water-cooled chiller whose COPs are 2.5, 3.0 and 4.5, respectively in FIG. 4. If the best performer among the three energy systems is to be identified based their efficiencies alone, the natural choice would be the water-cooled chiller. However, a closer look at the second dimension (second law efficiency) indicates that one of the air-cooled chillers has $COP_{II}$=0.8, which means this chiller is able extract 80% of the maximum operating efficiency achievable and that fact that it has lower $COP_I$ may be due its geographical location and operating in an unfavorable climatic conditions, which is significantly different from design conditions. Thus in accordance with the present disclosure, this indicates that the other two chillers may have to be studied further to identify reasons for not performing to their achievable efficiencies.

Similarly, the only way to compare different energy systems, say, an energy extractor with an energy converter, is based on the second law efficiencies since their first law efficiencies are inconsistent in the ratios of inputs to outputs. As illustrated in FIG. 4, the wind turbines are observed to be performing better than water-cooled chiller due to their higher $COP_{II}$ (higher second dimension metric). It may be noted that no matter the type of asset, the second dimension or the second law efficiency can never be greater than 1.0 and hence is a better metric for comparing inter-domain or cross-domain assets, wherein the inter-asset metric pertains to assets within a domain under consideration.

The present disclosure thus enables benchmarking assets to identify good and poor performers. It is observed that the first law based efficiency metric alone is not sufficient for benchmarking. The second law based metric helps in identifying how far an asset's performance deviates from the maximum operational efficiency achievable. The second law efficiency also helps in comparing apples to oranges, that is, cross-domain assets. In accordance with the present disclosure, the benchmarking therefore is based on two dimensions viz., the inter-asset metric or the first law efficiency and the intra-asset metric or the second law efficiency.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method for benchmarking asset performance based on operating conditions (200), the method comprising the steps of:

obtaining, by one or more hardware processors, a plurality of condition-aware reference curves pertaining to a plurality of assets, wherein the step of obtaining the plurality of condition-aware reference curves comprises receiving the plurality of condition-aware reference curves encompassing an operating range of the asset in a factory setting or obtaining the plurality of condition-aware reference curves via on-site test results, and wherein if an operating condition is not seen in the past, then a current observation is considered as part of the on-site test results (202);

estimating, by the one or more hardware processors, a maximum operating efficiency associated with each of the plurality of assets from the obtained plurality of condition-aware reference curves, wherein the maximum operating efficiency is the maximum operating efficiency under predefined operating conditions (204);

monitoring in real time, by the one or more hardware processor, one or more operating parameters pertaining to each of the plurality of assets (206);

computing, by the one or more hardware processors, an inter-asset metric for each of the plurality of assets using the monitored one or more operating parameters at each instance of time and a corresponding condition-aware reference curve, wherein the inter-asset metric is an efficiency metric based on the first law of thermodynamics (208);

computing, by the one or more hardware processors, an intra-asset metric for each of the plurality of assets at each instance of time, using the inter-asset metric and the maximum operating efficiency of a corresponding asset from the plurality of assets, wherein the intra-asset metric is an efficiency metric based on the second law of thermodynamics (210);

converting, by the one or more hardware processors, a time-series associated with the inter-asset metric and the intra-asset metric for each of the plurality of assets to point values using a statistical metric (212); and analyzing, by the one or more hardware processors, performance of an asset from the plurality of assets using the point values, wherein the step of analyzing performance of the asset comprises generating a scatter plot of the inter-asset metric along x-axis and the intra-asset metric along y-axis and comparing assets from the plurality of assets in two-dimensions, wherein the inter-asset metric involves comparing the performance of the asset with other assets and the intra-asset metric involves comparing the performance of the asset with the maximum operating efficiency associated with the asset, wherein the intra-asset metric helps in identifying deviation of the asset's performance from the maximum operational efficiency achievable, wherein the plurality of assets in the two-dimensions enable identifying inefficient assets that are analyzed further for finding a root cause, wherein analyzing the performance of the asset over time reduces downtime of an energy system includes an energy transferring device including a chiller and an energy converting device including a wind turbine, and wherein the chiller includes one of an air-cooled chiller and a water-cooled chiller (214).

2. The processor implemented method of claim 1, wherein the statistical metric is either mean or median of the inter-asset metric and the intra-asset metric calculated for every point in the time series.

3. The processor implemented method of claim 1, wherein the assets in the plurality of assets are cross-domain assets.

4. The processor implemented method of claim 3, wherein the inter-asset metric pertains to assets within a domain.

5. A system for benchmarking asset performance based on operating conditions, the system comprising:

one or more data storage devices operatively coupled to one or more hardware processors and configured to store instructions configured for execution by the one or more hardware processors to:

obtain a plurality of condition-aware reference curves pertaining to a plurality of assets, wherein the step of obtaining the plurality of condition-aware reference curves comprises receiving the plurality of condition-aware reference curves encompassing an operating range of the asset in a factory setting or obtaining the plurality of condition-aware reference curves via on-site test results, and wherein if an operating condition is not seen in the past, then a current observation is considered as part of the on-site test results;

estimate, a maximum operating efficiency associated with each of the plurality of assets from the obtained plurality of condition-aware reference curves, wherein the maximum operating efficiency is the maximum operating efficiency under predefined operating conditions;

monitor in real time one or more operating parameters pertaining to each of the plurality of assets;

compute an inter-asset metric for each of the plurality of assets using the monitored one or more operating parameters at each instance of time and a corresponding condition-aware reference curve, wherein the inter-asset metric is an efficiency metric based on the first law of thermodynamics;

compute an intra-asset metric for each of the plurality of assets at each instance of time, using the inter-asset metric and the maximum operating efficiency of a corresponding asset from the plurality of assets, wherein the intra-asset metric is an efficiency metric based on the second law of thermodynamics;

convert a time-series associated with the inter-asset metric and the intra-asset metric for each of the plurality of assets to point values using a statistical metric; and analyze performance of an asset from the plurality of assets using the point values, wherein analyzing the performance of the asset by generating a scatter plot of the inter-asset metric along x-axis and the intra-asset metric along y-axis and comparing assets from the plurality of assets in two-dimensions, wherein the inter-asset metric involves comparing the performance of the asset with other assets and the intra-asset metric involves comparing the performance of the asset with the maximum operating efficiency associated with the asset, wherein the intra-asset metric helps in identifying deviation of the asset's performance from the maximum operational efficiency achievable, wherein the plurality of assets in the two-dimensions enable identifying inefficient assets that are analyzed further for finding a root cause, wherein analyzing the performance of the asset over time reduces downtime of an energy system includes an energy transferring device including a chiller and an energy converting device including a wind turbine, and wherein the chiller includes one of an air-cooled chiller and a water-cooled chiller.

6. The system of claim 5, wherein the statistical metric is either mean or median of the inter-asset metric and the intra-asset metric calculated for every point in the time series.

7. The system of claim 5, wherein the assets in the plurality of assets are cross-domain assets.

8. The system of claim 7, wherein the inter-asset metric pertains to assets within a domain.

9. A computer program product comprising a non-transitory computer readable medium having a computer readable program embodied therein, wherein the computer readable program, when executed on a computing device, causes the computing device to:

obtain a plurality of condition-aware reference curves pertaining to a plurality of assets, wherein the step of obtaining the plurality of condition-aware reference curves comprises receiving the plurality of condition-aware reference curves encompassing an operating range of the asset in a factory setting or obtaining the plurality of condition-aware reference curves via on-site test results, and wherein if an operating condition is not seen in the past, then a current observation is considered as part of the on-site test results;

estimate, a maximum operating efficiency associated with each of the plurality of assets from the obtained plurality of condition-aware reference curves, wherein the maximum operating efficiency is the maximum operating efficiency under predefined operating conditions;

monitor in real time one or more operating parameters pertaining to each of the plurality of assets;

compute an inter-asset metric for each of the plurality of assets using the monitored one or more operating parameters at each instance of time and a corresponding condition-aware reference curve, wherein the inter-asset metric is an efficiency metric based on the first law of thermodynamics;

compute an intra-asset metric for each of the plurality of assets at each instance of time, using the inter-asset metric and the maximum operating efficiency of a corresponding asset from the plurality of assets, wherein the intra-asset metric is an efficiency metric based on the second law of thermodynamics;

convert a time-series associated with the inter-asset metric and the intra-asset metric for each of the plurality of assets to point values using a statistical metric; and analyze performance of an asset from the plurality of assets using the point values, wherein the step of analyzing performance of the asset comprises generating a scatter plot of the inter-asset metric along x-axis and the intra-asset metric along y-axis and comparing assets from the plurality of assets in two-dimensions, wherein the inter-asset metric involves comparing the performance of the asset with other assets and the intra-asset metric involves comparing the performance of the asset with the maximum operating efficiency associated with the asset, wherein the intra-asset metric helps in identifying deviation of the asset's performance from the maximum operational efficiency achievable, wherein the plurality of assets in the two-dimensions enable identifying inefficient assets that are analyzed further for finding a root cause, wherein analyzing the performance of the asset over time reduces downtime of an energy system includes an energy transferring device including a chiller and an energy converting device including a wind turbine, and wherein the chiller includes one of an air-cooled chiller and a water-cooled chiller.

10. The processor implemented method of claim 1, wherein the inter-asset metric $COP_I$ (Coefficient Of Performance) with reference to the chiller is computed as:

$$COP_I = \frac{\text{Cooling load}}{\dot{W}_{comp}}$$

where $\dot{W}_{comp}$ is an electrical power consumed by a compressor and the cooling load is calculated as, $$\text{Cooling load} = \dot{m}_w C_{pw} \Delta T$$

where $\dot{m}_w$ is a mass flow rate of chilled water through an evaporator, $C_{pw}$ is a specific heat capacity of water and $\Delta T$ is a temperature difference of the chilled water across the evaporator.

11. The processor implemented method of claim 1, wherein the intra-asset metric with reference to the chiller is computed as:

$$COP_{II} = \frac{COP_I}{COP_{max}}$$

Wherein the $COP_I$ is the inter-asset metric and the $COP_{max}$ is the maximum operating efficiency.

12. The system of claim 5, wherein the inter-asset metric $COP_I$ (Coefficient Of Performance) with reference to the chiller is computed as:

$$COP_I = \frac{\text{Cooling load}}{\dot{W}_{comp}}$$

where $\dot{W}_{comp}$ is an electrical power consumed by a compressor and the cooling load is calculated as, $$\text{Cooling load} = \dot{m}_w C_{pw} \Delta T$$

where $\dot{m}_w$ is a mass flow rate of chilled water through an evaporator, $C_{pw}$ is a specific heat capacity of water and $\Delta T$ is a temperature difference of the chilled water across the evaporator.

13. The system of claim 5, wherein the intra-asset metric with reference to the chiller is computed as:

$$COP_{II} = \frac{COP_I}{COP_{max}}$$

Wherein the $COP_I$ is the inter-asset metric and the $COP_{max}$ is the maximum operating efficiency.

\* \* \* \* \*